United States Patent
Chikaoka

(10) Patent No.: US 9,251,730 B2
(45) Date of Patent: Feb. 2, 2016

(54) IMAGE DISPLAY APPARATUS AND IMAGE SCANNING APPARATUS

(71) Applicant: Funai Electric Co., Ltd., Osaka (JP)

(72) Inventor: Atsuhiko Chikaoka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 95 days.

(21) Appl. No.: 14/030,036

(22) Filed: Sep. 18, 2013

(65) Prior Publication Data

US 2014/0078121 A1    Mar. 20, 2014

(30) Foreign Application Priority Data

Sep. 19, 2012    (JP) ................. 2012-206030

(51) Int. Cl.
*G09G 3/02* (2006.01)
*H04N 9/31* (2006.01)

(52) U.S. Cl.
CPC .................. *G09G 3/02* (2013.01); *G09G 3/025* (2013.01); *H04N 9/3129* (2013.01); *H04N 9/3164* (2013.01); *H04N 9/3185* (2013.01); *H04N 9/3194* (2013.01); *G09G 2310/0232* (2013.01); *G09G 2310/0286* (2013.01); *G09G 2310/04* (2013.01); *G09G 2320/0271* (2013.01); *G09G 2320/0606* (2013.01);
(Continued)

(58) Field of Classification Search
CPC . G09G 3/02; G09G 3/025; G09G 2310/0232; G09G 2310/0286; G09G 2310/04; G09G 2320/0271; G09G 2320/0606; G09G 2320/0666; G09G 2320/08; G09G 2340/04; G09G 2360/145; G02B 26/101; G02B 26/105; G02B 26/0833; G02B 26/0841; G02B 26/085; G02B 26/0858; G02B 26/0866; H04N 9/3129; H04N 9/3132; H04N 9/3135; H04N 9/3164; H04N 9/3185; H04N 9/3194
USPC ................. 345/204; 359/197.1, 201.2, 212.1, 359/212.2, 213.1, 214.1
See application file for complete search history.

(56) References Cited

U.S. PATENT DOCUMENTS

| | | | |
|---|---|---|---|
| 6,590,606 | B1 | 7/2003 | Hiller et al. |
| 7,130,095 | B1 | 10/2006 | Wood |
| 7,239,360 | B2 | 7/2007 | Bassi et al. |

(Continued)

FOREIGN PATENT DOCUMENTS

| | | |
|---|---|---|
| JP | 2000-509522 A | 3/1999 |
| JP | 2006-350370 A | 12/2006 |
| JP | 2008-547054 A | 12/2008 |

OTHER PUBLICATIONS

Extended European search report, from European patent application 13185064.6, dated Dec. 6, 2013, 12 pgs., mailed from the European Patent Office, Munich, Germany.

*Primary Examiner* — Tom Sheng
(74) *Attorney, Agent, or Firm* — Baker & Hostetler LLP

(57) ABSTRACT

This image display apparatus includes a light source emitting a laser beam, a scan mirror projecting an image by vertically and horizontally scanning the laser beam by swinging, and a scan control portion rendering the horizontal scanning amplitude of the scan mirror on the side of a projection image having a reduced length relatively large as compared with the horizontal scanning amplitude of the scan mirror on the side of the projection image having an increased length with respect to distortion in which the length of the upper side of the projection image and the length of the lower side of the projection image are different from each other.

18 Claims, 8 Drawing Sheets

(52) U.S. Cl.
CPC ... *G09G 2320/0666* (2013.01); *G09G 2320/08* (2013.01); *G09G 2340/04* (2013.01); *G09G 2360/145* (2013.01)

(56) References Cited

U.S. PATENT DOCUMENTS

| | | | |
|---|---|---|---|
| 7,384,158 B2 | 6/2008 | Ramachandran et al. | |
| 7,714,943 B2 | 5/2010 | Bassi et al. | |
| 7,978,387 B2 * | 7/2011 | Chikaoka | G02B 26/0833 359/198.1 |
| 8,482,503 B2 * | 7/2013 | Song | G09G 3/3677 345/100 |
| 2005/0057557 A1 * | 3/2005 | Kobayashi | H04N 5/7491 345/213 |
| 2007/0165192 A1 | 7/2007 | Prior et al. | |
| 2007/0171497 A1 | 7/2007 | Ishihara et al. | |
| 2008/0055557 A1 | 3/2008 | Yavid et al. | |
| 2008/0158524 A1 * | 7/2008 | Konno et al. | 353/99 |
| 2008/0285103 A1 * | 11/2008 | Mizumoto | G02B 26/0858 359/199.1 |
| 2009/0237628 A1 * | 9/2009 | Furukawa et al. | 353/98 |
| 2009/0244673 A1 * | 10/2009 | Takemoto et al. | 359/208.1 |
| 2010/0118368 A1 * | 5/2010 | Mizoguchi et al. | 359/212.2 |
| 2010/0231870 A1 * | 9/2010 | Chikaoka et al. | 353/85 |
| 2011/0013097 A1 * | 1/2011 | Freeman | H04N 9/3129 348/745 |
| 2011/0051210 A1 * | 3/2011 | Chikaoka et al. | 359/199.1 |
| 2011/0205497 A1 | 8/2011 | Wakabayashi et al. | |
| 2012/0182531 A1 | 7/2012 | Ueno et al. | |
| 2012/0250124 A1 * | 10/2012 | Choi et al. | 359/198.1 |
| 2012/0320441 A1 * | 12/2012 | Kann et al. | 359/224.1 |

* cited by examiner

CASE WHERE UPPER PORTION OF IMAGE IS EXPANDED AND IMAGE IS DISTORTED

REDUCE SCAN ANGLE IN UPPER PORTION AND
INCREASE SCAN ANGLE IN LOWER PORTION

REDUCE SCAN ANGLE IN UPPER PORTION

INCREASE SCAN ANGLE IN LOWER PORTION

CASE WHERE LOWER PORTION OF IMAGE IS EXPANDED AND IMAGE IS DISTORTED

INCREASE SCAN ANGLE IN UPPER PORTION AND REDUCE SCAN ANGLE IN LOWER PORTION

REDUCE SCAN ANGLE IN LOWER PORTION

INCREASE SCAN ANGLE IN UPPER PORTION

INCREASE OF SCAN ANGLE

REDUCTION OF SCAN ANGLE (SUPPLY OF OPPOSITE PHASE SIGNAL)

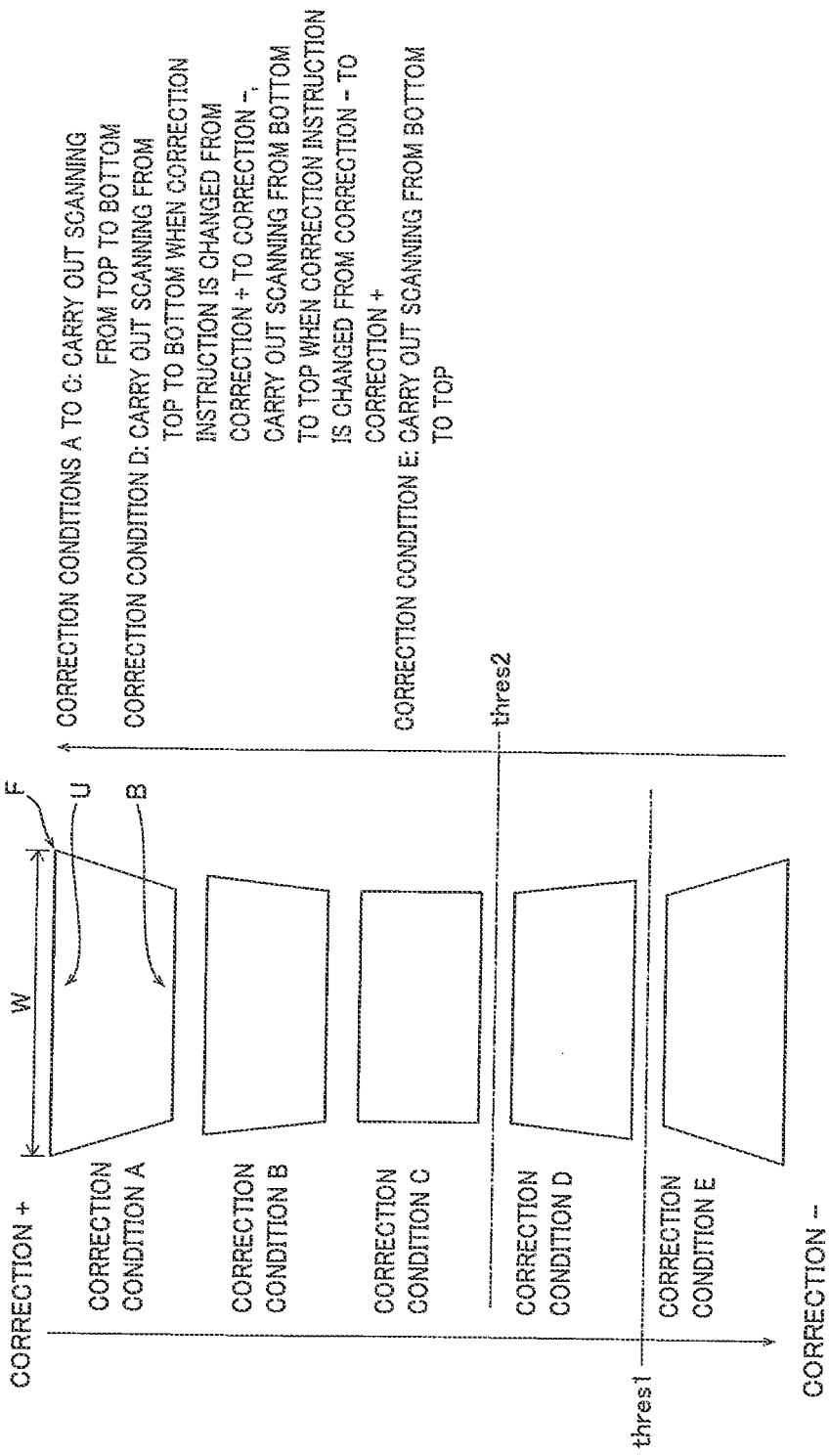

IMAGE DISPLAY APPARATUS AND IMAGE SCANNING APPARATUS

CROSS-REFERENCE TO RELATED APPLICATIONS

The present application claims the benefit of Japanese Application Serial No. 2012-206030, with a filing date of Sep. 19, 2012.

BACKGROUND OF THE INVENTION

1. Field of the Invention

The present invention relates to an image display apparatus and an image scanning apparatus each displaying an image by horizontal and vertical scanning.

2. Description of the Background Art

Various image display apparatuses, such as a laser projector, each displaying an image on a projection surface by projecting a laser beam on the projection surface are put to practical use. Such an image display apparatus scans a laser beam vertically and horizontally to project an image on a projection surface such as a screen.

When the image display apparatus projecting and displaying an image projects the image on the projection surface inclined with respect to a projection optical axis, for example, such distortion that the image originally having a rectangular shape is displayed in a trapezoidal shape is generated. There are various methods for correcting this distortion of the projection image. A method for correcting this distortion of the projection image is disclosed in National Patent Publication Gazette No. 2000-509522, Japanese Patent Laying-Open No. 2006-350370, and National Patent Publication Gazette No. 2008-547054, for example.

National Patent Publication Gazette No. 2000-509522 describes an apparatus for displaying a video image on an inclined projection surface. This apparatus includes a light source for emitting a substantially parallel light bundle for continuously illuminating image points of the video image, which can be modulated, a deflection device for scanning the light bundle in two dimensions, and a control device controlling the intensity modulation for the light bundle and the deflection of the light bundle according to a function obtained through a calculated distortion correction of the image at least with respect to the inclination of the projection surface. This apparatus recalculates line spacings and the density of the image points and displays the image with the recalculated line spacings and density of the image points.

Japanese Patent Laying-Open No. 2006-350370 describes a system including an electronic correction unit for receiving input image data and generating pre-distorted image data, an image projector for receiving the image data from the electronic correction unit and projecting a pre-distorted optical image corresponding to the pre-distorted image data or a pre-distorted image compensated by projection optical distortion, and an optical reflection assembly being located in the optical path of the pre-distorted optical image to project the optical image on a projection screen. The electronic correction unit of this system encodes the image data to pre-distort the geometry of the input image data such that optical distortion and geometric distortion associated with the image projector and a mirror of the reflection assembly are eliminated in the displayed optical image. This system is configured to eliminate the optical distortion and the geometric distortion when the pre-distorted image is projected on the screen through the projector.

National Patent Publication Gazette No. 2008-547054 discloses an apparatus including a laser for emitting a laser beam, a scanner, a drive circuit for driving a first scan mirror with a drive signal having an amplitude, a feedback circuit for determining the amplitude of the drive signal for each scan line, and a controller for correcting for image distortion. This apparatus is configured to equalize the lengths of a plurality of scan lines of a projected image to each other by adjusting the amplitude of the drive signal employed to sweep a laser beam forming each scan line of the image in order to correct image distortion in an image projection system. This apparatus corrects image distortion by adjusting the lengths of the scan lines.

As described above, a method for correcting the distortion of a projection image by conversely distorting a projected image by processing of image data is proposed. However, conventionally, the load of correction arithmetic processing of the image data is disadvantageously increased.

SUMMARY OF THE INVENTION

The present invention has been proposed in order to solve the aforementioned problem, and an object of the present invention is to correct the distortion of a projection image by controlling a scan operation through a simple method.

An image display apparatus according to a first aspect of the present invention includes a light source emitting a laser beam, a scan mirror projecting an image by vertically and horizontally scanning the laser beam by swinging, and a scan control portion rendering the horizontal scanning amplitude of the scan mirror on the side of a projection image having a reduced length relatively large as compared with the horizontal scanning amplitude of the scan mirror on the side of the projection image having an increased length with respect to distortion in which the length of the upper side of the projection image and the length of the lower side of the projection image are different from each other.

As hereinabove described, the image display apparatus according to the first aspect of the present invention is provided with the scan control portion rendering the horizontal scanning amplitude of the scan mirror on the side having the reduced length relatively large as compared with the horizontal scanning amplitude of the scan mirror on the side having the increased length with respect to the distortion in which the lengths of the upper side and the lower side of the projection image are different from each other, whereby the distortion of the projection image can be corrected by a simple method for controlling the horizontal scanning amplitude of the scan mirror. In other words, the distortion of the projection image can be corrected by a simple method for control of rendering the horizontal scanning amplitude on the side of the projection image having the reduced length larger as compared with the horizontal scanning amplitude on the side of the projection image having the increased length, a simple method for control of rendering the horizontal scanning amplitude on the side of the projection image having the increased length smaller as compared with the horizontal scanning amplitude on the side of the projection image having the reduced length, a combination of these methods, or the like.

In the aforementioned image display apparatus according to the first aspect, the scan control portion is preferably configured to switch between vertical scanning from the upper side of the projection image to the lower side of the projection image and vertical scanning from the lower side of the projection image to the upper side of the projection image and operate the scan mirror. According to this structure, vertical scanning can be switched to vertical scanning in a proper direction according to the control of the horizontal scanning amplitude in horizontal scanning.

In this case, the scan control portion is preferably configured to switch a vertical scanning direction to a direction from the side on which the horizontal scanning amplitude of the scan mirror is relatively reduced to the side on which the horizontal scanning amplitude of the scan mirror is relatively increased. As the amplitude of a MEMS (micro electro mechanical system) scan mirror or the like is smaller, the response is generally better due to the upper limit of the applied voltage/current of a device, the restriction of a driver gain, or the like. Therefore, vertical scanning is carried out from the side on which the horizontal scanning amplitude is relatively reduced to the side on which the horizontal scanning amplitude is relatively increased as in the present invention, whereby the horizontal scanning amplitude can be increased at the end of the vertical scanning, and hence the scan mirror can be driven to reduce the horizontal scanning amplitude during a blanking period of image frame scanning. Consequently, the horizontal scanning amplitude of the scan mirror can be controlled with good response during the blanking period.

In the aforementioned structure of switching between the vertical scanning from the upper side of the projection image to the lower side of the projection image and the vertical scanning from the lower side of the projection image to the upper side of the projection image, the image display apparatus preferably further includes an image processing portion changing the order of transfer of video data of the projection image according to a vertical scanning direction. According to this structure, inversion of the projection image can be easily prevented when the vertical scanning direction is switched.

In the aforementioned image display apparatus according to the first aspect, the scan control portion is preferably configured to perform at least one of control of increasing the horizontal scanning amplitude on the side of the projection image having the reduced length and control of reducing the horizontal scanning amplitude on the side of the projection image having the increased length. According to this structure, the horizontal scanning amplitude of the scan mirror on the side of the projection image having the reduced length can be easily rendered relatively large as compared with the horizontal scanning amplitude of the scan mirror on the side of the projection image having the increased length.

In the aforementioned image display apparatus according to the first aspect, the scan control portion is preferably configured to generate a drive signal varying with time in one frame and control the horizontal scanning amplitude of the scan mirror so as to reduce the amount of the distortion. According to this structure, the control of the horizontal scanning amplitude can be performed with the drive signal varying with time in one frame according to the distorted shape of the projection image.

In this case, the scan control portion is preferably configured to generate the drive signal varying at least one of a signal amplitude, a duty ratio, a signal cycle, and a non-signal period with time and control the horizontal scanning amplitude of the scan mirror. According to this structure, by various methods suitable for drive and control of the scan mirror, the drive signal varying with time in one frame is generated, and the horizontal scanning amplitude can be controlled.

In the aforementioned structure of generating the drive signal varying at least one of the signal amplitude, the duty ratio, the signal cycle, and the non-signal period with time, the drive signal varying with time in one frame preferably includes an amplitude modulated drive signal, a pulse width modulated drive signal, a frequency modulated drive signal, and an intermittent drive signal. According to this structure, the drive signal varying at least one of the signal amplitude, the duty ratio, the signal cycle, and the non-signal period with time can be easily generated.

In the aforementioned image display apparatus according to the first aspect, the scan control portion is preferably configured to perform control of reducing the horizontal scanning amplitude of the scan mirror during a blanking period between frames of the projection image. According to this structure, the horizontal scanning amplitude of the scan mirror can be controlled with good response as compared with the case where the horizontal scanning amplitude of the scan mirror is increased during the blanking period.

In the aforementioned structure of switching between the vertical scanning from the upper side of the projection image to the lower side of the projection image and the vertical scanning from the lower side of the projection image to the upper side of the projection image, the scan control portion is preferably configured to switch a vertical scanning direction on the basis of a user's setting operation. According to this structure, the user can determine a proper vertical scanning direction while confirming a display state where the vertical scanning direction is switched, for example.

In the aforementioned structure of switching between the vertical scanning from the upper side of the projection image to the lower side of the projection image and the vertical scanning from the lower side of the projection image to the upper side of the projection image, the scan control portion is preferably configured to switch a vertical scanning direction so that a period during which the horizontal scanning amplitude of the scan mirror is increasingly changed is longer than a period during which the horizontal scanning amplitude of the scan mirror is decreasingly changed. According to this structure, as the amplitude of a MEMS scan mirror or the like is smaller, the response is generally better, and hence a period of good response can be relatively increased in drive control of the scan mirror.

In the aforementioned structure of switching between the vertical scanning from the upper side of the projection image to the lower side of the projection image and the vertical scanning from the lower side of the projection image to the upper side of the projection image, the scan control portion is preferably configured to switch a vertical scanning direction on the basis of the amount of change of the horizontal scanning amplitude of the scan mirror during a blanking period between frames of the projection image. According to this structure, the vertical scanning direction can be switched to a direction of reducing the horizontal scanning amplitude during the blanking period when the amount of change of the horizontal scanning amplitude of the scan mirror during the blanking period is large, for example, and hence the scan mirror can be controlled with good response even when the amount of change of the amplitude is large.

In this case, the scan control portion is preferably configured to switch a vertical scanning direction when the amount of change of the horizontal scanning amplitude during the blanking period exceeds a first threshold or a second threshold, the first threshold preferably includes a threshold in the case of vertical scanning from the upper side of the projection image to the lower side of the projection image, the second threshold preferably includes a threshold in the case of vertical scanning from the lower side of the projection image to the upper side of the projection image, and the first threshold is preferably larger than the second threshold. According to this structure, a larger amount of change (first threshold) is employed for switching of the vertical scanning direction in the case of the vertical scanning from the upper side to the lower side, and the vertical scanning can be restored to the original vertical scanning from the upper side to the lower side at the second threshold smaller than the first threshold in the case where the vertical scanning is switched to the vertical scanning from the lower side to the upper side. Consequently, employing the general vertical scanning from the upper side of the projection image to the lower side of the projection image as a basis, the vertical scanning can be switched to the vertical scanning from the lower side to the upper side only when it is difficult to employ the vertical scanning from the upper side to the lower side. Thus, frequent switching of the vertical scanning direction can be suppressed, and an increase in control load following direction switching can be suppressed.

In the aforementioned image display apparatus according to the first aspect, the scan mirror preferably includes a MEMS scan mirror. According to this structure, as compared with other types of scan mirrors, advantageous effects such as downsizing, low power consumption, and speeding up of processing can be obtained.

In this case, the MEMS scan mirror preferably has a mirror portion and a first rotary shaft and a second rotary shaft orthogonal to each other in the same plane, and the mirror portion is preferably configured such that swinging thereof about the first rotary shaft and swinging thereof about the second rotary shaft are controlled to be capable of independently controlling vertical scanning and horizontal scanning. According to this structure, the MEMS scan mirror alone can have two orthogonal axes of motion (vertical scanning and horizontal scanning) without employing another drive mechanism.

An image scanning apparatus according to a second aspect of the present invention includes a scanning portion displaying an image by vertical scanning and horizontal scanning and a scan control portion rendering the width of the horizontal scan line of the scanning portion on the side of the image having a reduced length relatively large as compared with the width of the horizontal scan line of the scanning portion on the side of the image having an increased length with respect to distortion in which the length of the upper side of the image and the length of the lower side of the image are different from each other.

As hereinabove described, the image scanning apparatus according to the second aspect of the present invention is provided with the scan control portion rendering the width of the horizontal scan line of the scanning portion on the side having the reduced length relatively large as compared with the width of the horizontal scan line of the scanning portion on the side having the increased length with respect to the distortion in which the lengths of the upper side and the lower side of the image are different from each other, whereby the distortion of the image can be corrected by a simple method for control of the horizontal scan line of the scanning portion. In other words, the distortion of the image can be corrected by control of rendering the width of the horizontal scan line on the side of the image having the reduced length larger as compared with the width of the horizontal scan line on the side of the image having the increased length, control of rendering the width of the horizontal scan line on the side of the image having the increased length smaller as compared with the width of the horizontal scan line on the side of the image having the reduced length, a combination of these types of control, or the like.

In the aforementioned image scanning apparatus according to the second aspect, the scan control portion is preferably configured to switch between vertical scanning from the upper side of the image to the lower side of the image and vertical scanning from the lower side of the image to the upper side of the image and operate the scanning portion. According to this structure, vertical scanning can be switched to vertical scanning in a proper direction according to the control of the horizontal scan line in horizontal scanning.

In this case, the scan control portion is preferably configured to switch a vertical scanning direction to a direction from a side on which the width of the horizontal scan line is relatively reduced to a side on which the width of the horizontal scan line is relatively increased. According to this structure, the width of the horizontal scan line can be increased at the end of the vertical scanning, and hence the scanning portion can be driven to reduce the width of the horizontal scan line during a blanking period of image frame scanning. Consequently, the width of the horizontal scan line of the scanning portion can be controlled with good response during the blanking period when a MEMS scan mirror or the like is employed as the scanning portion, for example.

In the aforementioned structure of switching between the vertical scanning from the upper side of the image to the lower side of the image and the vertical scanning from the lower side of the image to the upper side of the image, the image scanning apparatus preferably further includes an image processing portion changing the order of transfer of video data of the image according to a vertical scanning direction. According to this structure, inversion of the image can be easily prevented when the vertical scanning direction is switched.

In the aforementioned image scanning apparatus according to the second aspect, the scan control portion is preferably configured to perform at least one of control of increasing the width of the horizontal scan line on the side of the image having the reduced length and control of reducing the width of the horizontal scan line on the side of the image having the increased length. According to this structure, the width of the horizontal scan line of the scanning portion on the side of the image having the reduced length can be easily rendered relatively large as compared with the width of the horizontal scan line of the scanning portion on the side of the image having the increased length.

Functional portions such as the scan control portion and the image processing portion according to the present invention can have a circuit configuration employing an electronic component and also can be configured as a functional module employing computer hardware and software and so configured that the computer hardware executes the software.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a conceptual diagram for illustrating the correction processing of the projection image according to the embodiment of the present invention.

DESCRIPTION OF THE PREFERRED EMBODIMENTS

An embodiment of the present invention is hereinafter described with reference to the drawings.

The present invention is applicable to various image display apparatuses each displaying an image by vertical scanning and horizontal scanning, and particularly it is suitably applied to an image display apparatus including a scan mirror scanningly driven. As an image display apparatus according to the embodiment of the present invention, the exemplary structure of a laser projector 1 including a MEMS mirror is now described with reference to FIGS. 1 and 2.

The MEMS mirror is an apparatus having a mirror reflecting a laser beam, scanningly driven in an X-axis direction and a Y-axis direction according to a drive current waveform signal.

Figure 1:
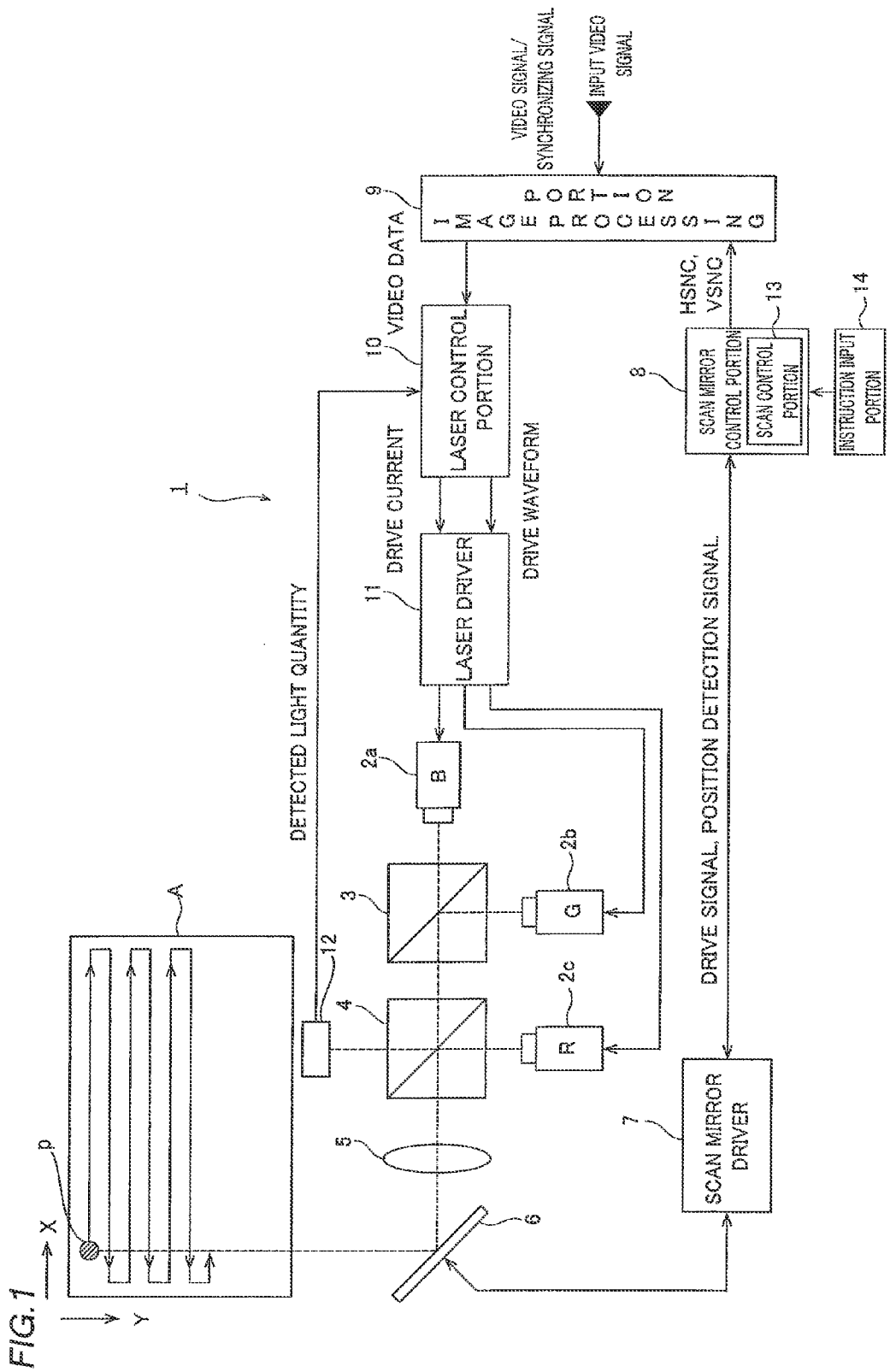
FIG. 1 is a block diagram of main sections of an image display apparatus according to an embodiment of the present invention.

As shown in FIG. 1, the laser projector 1 is mainly constituted by laser beam sources 2a to 2c, various optical elements (dichroic mirrors 3 and 4 and a lens 5), a MEMS scan mirror 6 (hereinafter referred to as the "scan mirror 6"), and various drive/control units (a scan mirror driver 7, a scan mirror control portion 8, an image processing portion 9, a laser control portion 10, and a laser driver 11). The laser beam sources 2a to 2c are examples of the "light source" in the present invention. The scan mirror 6 is an example of the "operation portion" in the present invention.

The laser projector 1 displays a color image according to an input video signal on a projection surface A such as a screen or a wall by synthesizing laser beams of blue, green, and red color components emitted from the laser beam sources 2a to 2c of B, G, and R, which are laser emitting portions, by an optical portion constituted by the optical elements and thereafter projecting the synthesized laser beam on the projection surface A.

The laser beam sources 2a to 2c are driven independently of each other by drive currents individually supplied from the laser driver 11. Thus, the laser beams of specified wavelengths are emitted. In other words, a laser beam of a blue color component (B) is emitted from the laser beam source 2a, a laser beam of a green color component (G) is emitted from the laser beam source 2b, and a laser beam of a red color component (R) is emitted from the laser beam source 2c.

The dichroic mirrors 3 and 4 both transmit only laser beams of specified wavelengths and reflect the others thereby synthesizing the laser beams of the color components of R, G, and B emitted from the laser beam sources 2a to 2c. Specifically, the laser beams of the blue color component and the green color component emitted from the laser beam sources 2a and 2b are synthesized in the dichroic mirror 3 on the upstream of an optical path, and thereafter are emitted to the dichroic mirror 4 on the downstream of the optical path. This emitted synthesized beam and the laser beam of the red color component emitted from the laser beam source 2c are further synthesized in the dichroic mirror 4, and are emitted as a targeting final color beam. This emitted color beam is incident on the scan mirror 6 through the lens 5.

The scan mirror 6 is scanningly driven by the scan mirror driver 7 into which a drive signal is input from the scan mirror control portion 8, reflects the color beam incident on the scan mirror 6 according to the deflection angle (amplitude) of a mirror surface, and projects the same on the projection surface A. This scan mirror 6 has a two-dimensional degree of freedom corresponding to the horizontal scanning direction (X) and the vertical scanning direction (Y) of the projection surface A. The scan mirror 6 projects a color image on the projection surface A by line sequential scanning corresponding to the two-dimensional displacement. This line sequential scanning is continuously carried out in one image frame by repetitively advancing a laser spot p in one direction along a horizontal scan line on the projection surface A and returning the laser spot p in an opposite direction along a subsequent horizontal scan line.

The laser projector 1 according to this embodiment projects and displays the color image on the projection surface A by vertically and horizontally scanning the color beam with the scan mirror 6 on the basis of the video signal input from an external portion such as a personal computer. Basic image projection processing of the laser projector 1 is performed in the following manner.

The image processing portion 9 transfers video data to the laser control portion 10 at prescribed time intervals on the basis of the input video signal (a video signal, a synchronizing signal, etc.). Thus, the laser control portion 10 obtains pixel information at a prescribed scan position. In this video data transfer processing, the image processing portion 9 transfers video data to the laser control portion 10 in order according to information of a horizontal scan position and a vertical scan position input as horizontal and vertical synchronizing signals (HSHC, VSNC) from the scan mirror control portion 8.

The laser control portion 10 controls the laser driver 11 with a drive current waveform signal in order to project an image including a plurality of pixels on a projection range on the basis of the pixel information of the video data. According to this embodiment, a light detector 12 detecting the synthesized beam reflected by the dichroic mirror 4 in order to detect the emitted laser beam is provided. The light detector 12 is connected to the laser control portion 10 and outputs the light quantity (gradation) of the detected laser beam to the laser control portion 10. The laser control portion 10 determines whether or not the gradation is correct as compared with the pixel information at a scan position on the basis of the light quantity input from the light detector 12. The laser control portion 10 adjusts outputs of the laser beam sources 2a to 2c so that the gradation is correct when the gradation is not correct.

The laser driver 11 drives the laser beam sources 2a to 2c to allow the same to emit the laser beams on the basis of the aforementioned control performed by the laser control portion 10.

The laser beam sources 2a to 2c emit the laser beams when a current greater than or equal to a vibration threshold current is supplied from the laser driver 11 and output the laser beams having larger light quantities (luminance) as the value of the supplied current increases. Furthermore, the laser beam sources 2a to 2c stop outputting the laser beams when a current less than the vibration threshold current is supplied.

The scan mirror 6 is drivingly displaced about two axes orthogonal to each other in the same plane by the scan mirror driver 7, and the scan mirror 6 is a small-sized vibrating mirror element having a mirror surface scanningly displaceable at a prescribed deflection angle. Thus, the scan mirror 6 can scan a reflected laser beam in the X-axis direction and the Y-axis direction (horizontal and vertical directions).

The scan mirror control portion 8 controls the scan mirror driver 7 with the drive signal on the basis of the horizontal and vertical synchronizing signals. The scan mirror 6 is scanningly displaced in the horizontal and vertical directions in zigzags over the projection range on the basis of control performed by the scan mirror control portion 8 when reflecting the synthesized beam incident from the lens 5. Thus, the scan mirror 6 projects the color image on the projection surface A.

The scan mirror control portion 8 has a scan control portion 13 controlling the deflection angle of the scan mirror 6 in the horizontal scanning direction to change the width of a horizontal scan line. The scan control portion 13 has a function of changing the vertical scanning direction of the scan mirror from the upper side of a projection image to the lower side thereof or the lower side of the projection image to the upper side thereof. According to this embodiment, control performed by the scan control portion 13 is performed on the basis of a user's setting operation with an instruction input portion 14.

The control performed by the scan control portion 13 is described later in detail with reference to FIGS. 3 to 8.

Figure 2:
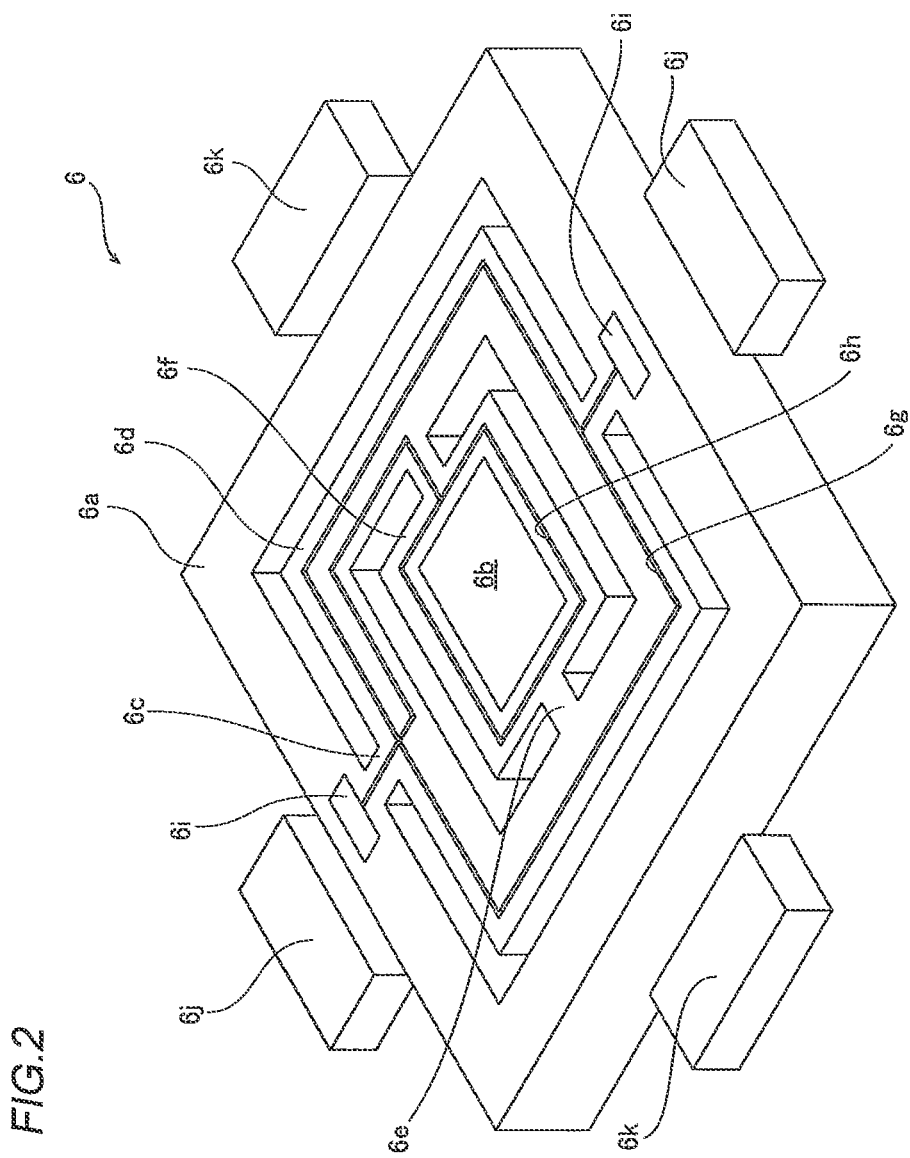
FIG. 2 is a diagram showing a MEMS scan mirror according to the embodiment of the present invention.

FIG. 2 shows an example of the MEMS scan mirror 6. The scan mirror 6 includes a rectangular frame-shaped substrate 6a and a mirror 6b. Inside the substrate 6a, a rectangular frame-shaped outer frame 6d is swingably mounted through an outer rotary shaft 6c. Inside the outer frame 6d, a rectangular inner frame 6f is swingably mounted through an inner rotary shaft 6e. The mirror 6b is provided in the center of the inner frame 6f. The mirror 6b is an example of the "mirror portion" in the present invention. The outer rotary shaft 6c and the inner rotary shaft 6e are examples of the "first rotary shaft" and the "second rotary shaft" in the present invention, respectively.

The reflection direction of the mirror 6b mounted on the substrate 6a through the outer frame 6d and the inner frame 6f is unambiguously specified on the basis of the amount of rotation (deflection angle) of the inner frame 6f employing the inner rotary shaft 6e as a shaft center and the amount of rotation (deflection angle) of the outer frame 6d employing the outer rotary shaft 6c orthogonal to the inner rotary shaft 6e as a shaft center.

An outer coil 6g is arranged in the outer frame 6d to surround the mirror 6b. An inner coil 6h is arranged in the inner frame 6f to surround the mirror 6b. The outer coil 6g and the inner coil 6h are connected to a pair of electrodes 6i, respectively, in an electrically separated state from each other. Drive currents are individually supplied from the scan mirror driver 7 to the outer coil 6g and the inner coil 6h through these electrodes 6i according to a drive waveform signal.

Outside the substrate 6a, two pairs of permanent magnets 6j and 6k are arranged orthogonally to each other. A first pair of permanent magnets 6j are arranged such that the north pole and the south pole thereof are opposed to each other in the axial direction of the outer rotary shaft 6c. A second pair of permanent magnets 6k are arranged such that the north pole and the south pole thereof are opposed to each other in the axial direction of the inner rotary shaft 6e.

An operation principle in the case where the mirror 6b is electromagnetically driven to carry out scanning is now described.

When a drive current for horizontal scanning is supplied to the electrodes 6i, the mirror 6b is swung about the inner rotary shaft 6e by electromagnetic force generated between the inner coil 6h to which the drive current flows and the first pair of permanent magnets 6j. In one horizontal scanning period corresponding to a half of the swinging cycle, the mirror 6b sequentially reflects the laser beam corresponding to one horizontal direction emitted from the laser beam sources 2a to 2c over time, whereby an image corresponding to one horizontal scan line is projected and displayed on the projection surface A.

In other words, the scan mirror control portion 8 controls the drive current for horizontal scanning supplied from the scan mirror driver 7, whereby the deflection angle of the mirror 6b swung about the inner rotary shaft 6e is changed, and consequently the width of the horizontal scan line is changed.

On the other hand, when a drive current for vertical scanning is supplied to the electrodes 6i, the mirror 6b is swung about the outer rotary shaft 6c by electromagnetic force generated between the outer coil 6g to which the drive current flows and the second pair of permanent magnets 6k. In one vertical scanning period corresponding to a half of the swinging cycle, the reflection of the laser beam corresponding to one horizontal scan line is repeated the number of times corresponding to the number of horizontal scan lines to project and display one frame of an image on the projection surface A.

In other words, the scan mirror control portion 8 controls the drive current for vertical scanning supplied from the scan mirror driver 7, whereby a start point from which the mirror 6b is swung about the outer rotary shaft 6c is changed. Thus, when the image is projected, vertical scanning from the upper side of the projection image to the lower side of the projection image and vertical scanning from the lower side of the projection image to the upper side of the projection image can be changed.

Figure 3A:
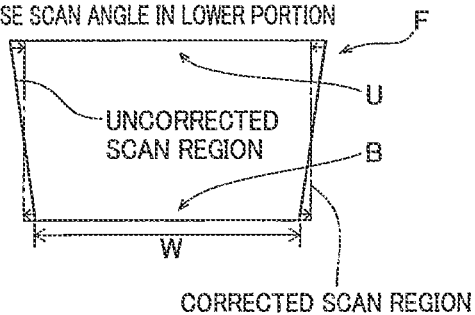
FIGS. 3A to 3C each illustrate an example of a correction of a projection image according to the embodiment of the present invention.
Figure 3B:
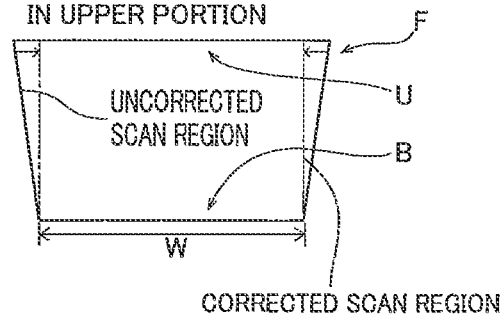
Figure 3C:
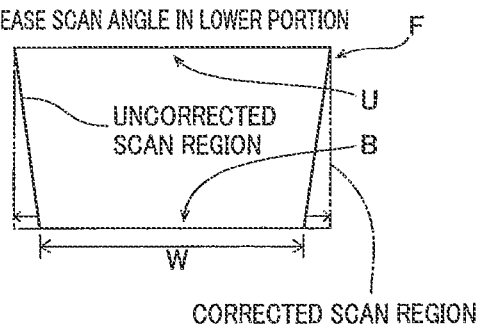

According to this embodiment, when the projection image is distorted to a trapezoidal shape having an expanded upper potion as shown in FIGS. 3A to 3C (when a projection image F is distorted to a trapezoidal shape having an upper side U and a lower side B whose length is smaller than the length of the upper side U), the scan control portion 13 corrects the image in the following manner, so that the image having a rectangular or square shape is projected.

For example, as shown in FIG. 3A, the scan control portion 13 reduces the mirror deflection angle of horizontal scanning on the upper side U of the image F and increases the mirror deflection angle of horizontal scanning on the lower side B of the image F thereby correcting the image distorted to the trapezoidal shape to a rectangular shape.

Furthermore, for example, as shown in FIG. 3B, the scan control portion 13 reduces the mirror deflection angle of horizontal scanning on the upper side U of the image F thereby correcting the image distorted to the trapezoidal shape to a rectangular shape.

In addition, for example, as shown in FIG. 3C, the scan control portion 13 increases the mirror deflection angle of horizontal scanning on the lower side B of the image F thereby correcting the image distorted to the trapezoidal shape to a rectangular shape.

These corrections can be performed by controlling the vertical scanning direction for projecting the image and the line width of horizontal scanning (the mirror deflection angle of horizontal scanning).

Figure 3D:
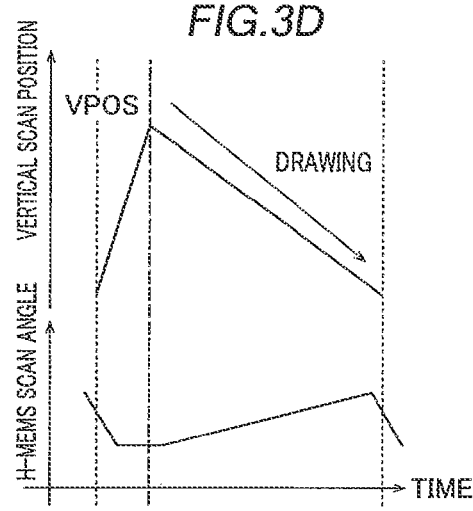
FIG. 3D is a diagram showing changes of scan angles in a horizontal direction and a vertical direction in the case of performing a correction.

For example, as shown in FIG. 3D, the scan control portion 13 lowers a vertical scan position (VPOS) over time of one frame scanning to vertically scan the image from the upper side U to the lower side B. At this time, the scan control portion 13 increases the length of the scan line by gradually increasing the mirror deflection angle (H-MEMS scan angle) for horizontal scanning to change a drawn image to a trapezoidal shape inverse to the distortion. Consequently, as in the example of correction shown in FIG. 3C, the projection image F distorted to the trapezoidal shape having the expanded upper potion on the projection surface A is corrected to the rectangular shape.

In other words, the scan control portion 13 performs control of rendering the horizontal scanning amplitude W of the scan mirror 6 on the lower side B relatively large as compared with the horizontal scanning amplitude W of the scan mirror 6 on the upper side U with respect to the distortion in which the length of the upper side U of the projection image F is larger than the length of the lower side B of the projection image F.

Figure 4A:
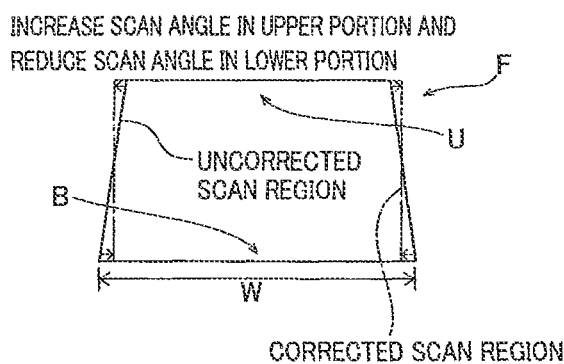
FIGS. 4A to 4C each illustrate another example of the correction of the projection image according to the embodiment of the present invention.
Figure 4B:
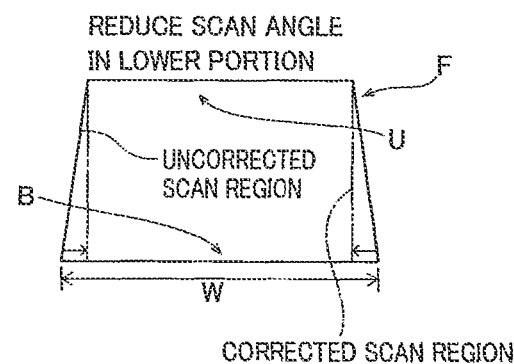
Figure 4C:
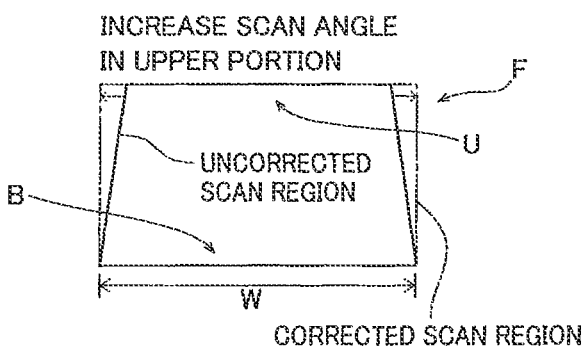

On the other hand, according to this embodiment, when the projection image F is distorted to a trapezoidal shape having an expanded lower potion as shown in FIGS. 4A to 4C (when the projection image F is distorted to a trapezoidal shape having an upper side U and a lower side B whose length is larger than the length of the upper side U), the scan control portion 13 corrects the image in the following manner, so that the image having a rectangular or square shape is projected.

For example, as shown in FIG. 4A, the scan control portion 13 increases the mirror deflection angle of horizontal scanning on the upper side U of the image F and reduces the mirror deflection angle of horizontal scanning on the lower side B of the image F thereby correcting the image distorted to the trapezoidal shape to a rectangular shape.

Furthermore, for example, as shown in FIG. 4B, the scan control portion 13 reduces the mirror deflection angle of horizontal scanning on the lower side B of the image F thereby correcting the image distorted to the trapezoidal shape to a rectangular shape.

In addition, for example, as shown in FIG. 4C, the scan control portion 13 increases the mirror deflection angle of horizontal scanning on the upper side U of the image F thereby correcting the image distorted to the trapezoidal shape to a rectangular shape.

These corrections can be performed by controlling the vertical scanning direction for projecting the image and the line width of horizontal scanning (the mirror deflection angle of horizontal scanning).

Figure 4D:
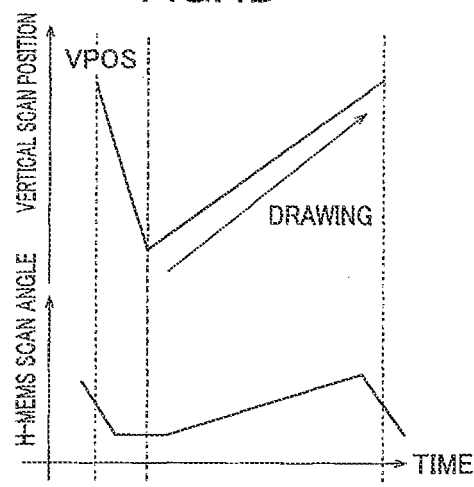
FIG. 4D is a diagram showing changes of the scan angles in the horizontal direction and the vertical direction in the case of performing a correction.

For example, as shown in FIG. 4D, the scan control portion 13 raises the vertical scan position (VPOS) over time of one frame scanning to vertically scan the image from the lower side B to the upper side U. At this time, the scan control portion 13 increases the length of the scan line by gradually increasing the mirror deflection angle (H-MEMS scan angle) for horizontal scanning to change a drawn image to a trapezoidal shape inverse to the distortion. Consequently, as in the example of correction shown in FIG. 4C, the projection image F distorted to the trapezoidal shape having the expanded lower potion on the projection surface A is corrected to the rectangular shape.

In other words, the scan control portion 13 performs control of rendering the horizontal scanning amplitude W of the scan mirror 6 on the upper side U relatively large as compared with the horizontal scanning amplitude W of the scan mirror 6 on the lower side B with respect to the distortion in which the length of the lower side B of the projection image F is larger than the length of the upper side U of the projection image F.

Figure 5:
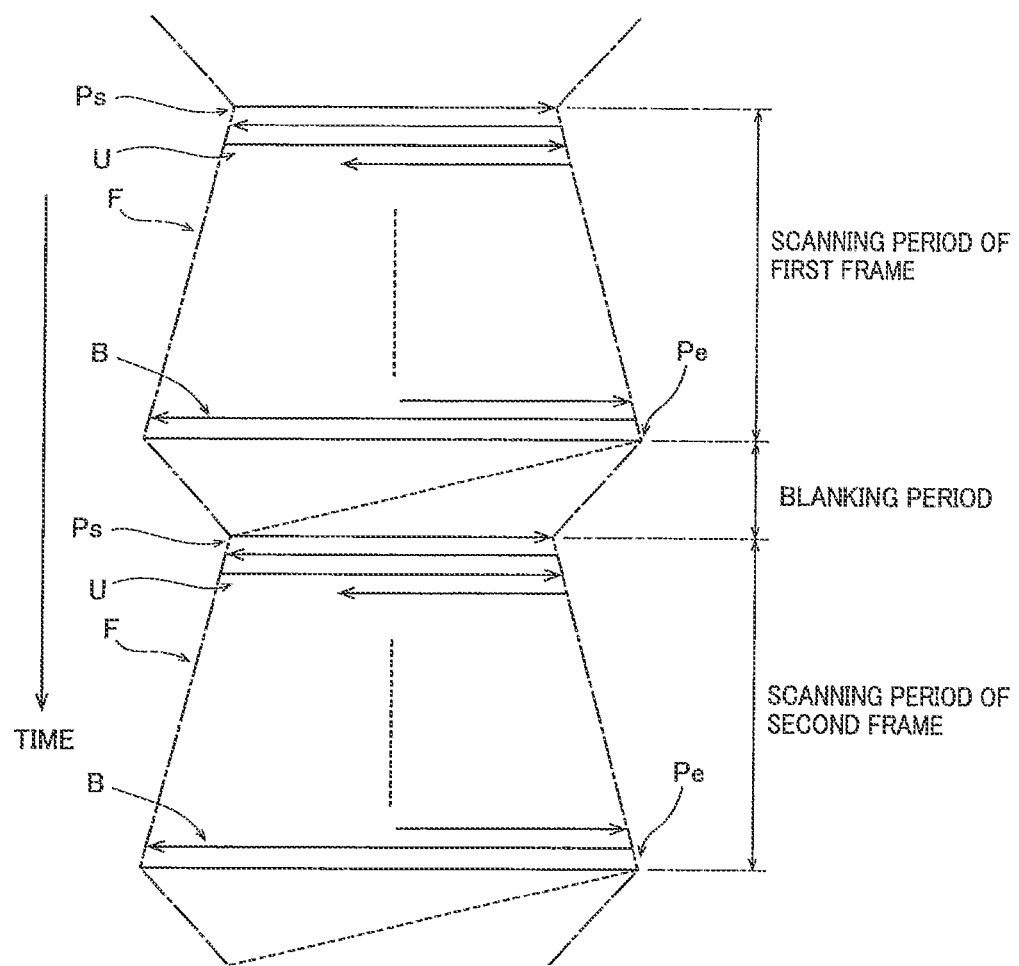
FIG. 5 is a conceptual diagram for illustrating the correction of the projection image according to the embodiment of the present invention.

FIG. 5 is a diagram for illustrating the aforementioned corrections on the basis of time course.

In other words, the scan control portion 13 (see FIG. 1) performs control of rendering the width W of the horizontal scan line on the side having a smaller length relatively large as compared with the width W of the horizontal scan line on the side having a larger length with respect to the distortion in which the lengths of the upper side U and the lower side B of the projection image F are different from each other.

With respect to vertical scanning, the scan control portion 13 vertically scans the laser beam from the side having a relatively small horizontal scan line (amplitude) to the side having a relatively large horizontal scan line (amplitude) for one frame. Thus, the horizontal scan line (amplitude) becomes relatively large at the end of the vertical scanning. Consequently, the scan mirror 6 operates to reduce the horizontal scanning amplitude W when moving from the scanning end point Pe of a current frame to the scanning start point Ps of a subsequent frame in a blanking period.

The image processing portion 9 reverses the order of transfer of video data of each frame, so that the projection image F is not inverted according to a change of the vertical scanning direction.

Figure 6A:
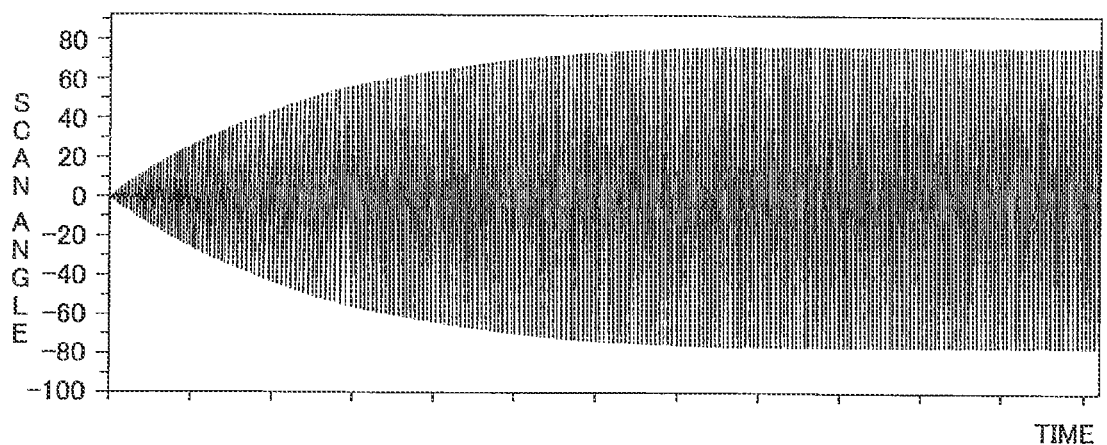
FIG. 6A illustrates a response in the case where the scan angle of the MEMS scan mirror according to the embodiment of the present invention is increased.
Figure 6B:
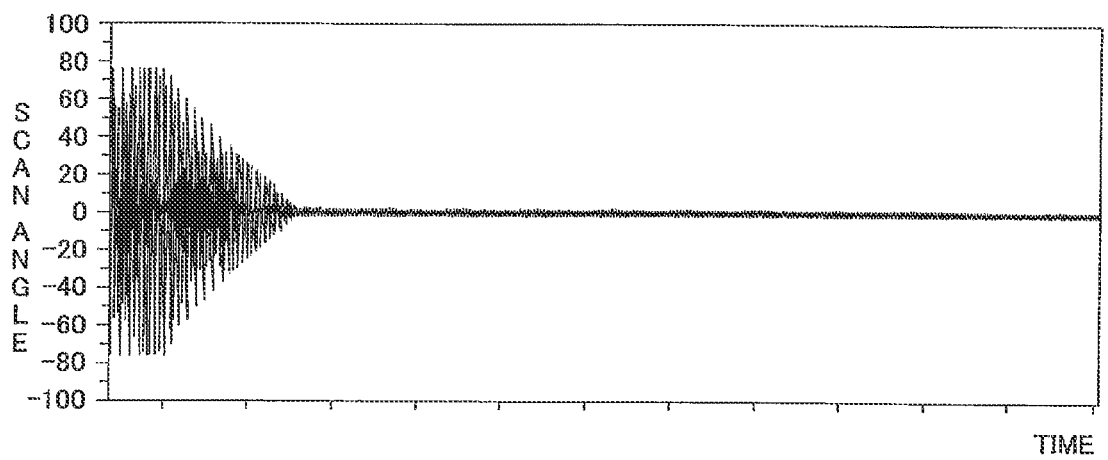
FIG. 6B illustrates a response in the case where the scan angle of the MEMS scan mirror according to the embodiment of the present invention is reduced.

According to the general characteristics of the scan mirror, an operation of reducing a horizontal scanning deflection angle (see FIG. 6B) has a better response than an operation of increasing the horizontal scanning deflection angle (see FIG. 6A) due to the upper limit of the applied voltage/current of a device, the restriction of a driver gain, or the like, as shown in FIGS. 6A and 6B. A reduction of the horizontal scanning deflection angle can be realized in a relatively short time as compared with an increase of the horizontal scanning deflection angle by a method such as stopping of supply of the drive signal or supply of the drive signal of a phase opposite to the phase in driving a normal MEMS.

The blanking period (see FIG. 5) between the image frames is set to a very short period in order to make the sharp projection image F. According to this embodiment, the scan mirror 6 can scanningly operates without any problem also during this short blanking period.

As described above, the scan control portion 13 generates a drive signal varying with time in one frame to reduce the amount of distortion according to the distorted shape of the projection image F and scanningly operates the scan mirror 6.

Figure 7A:
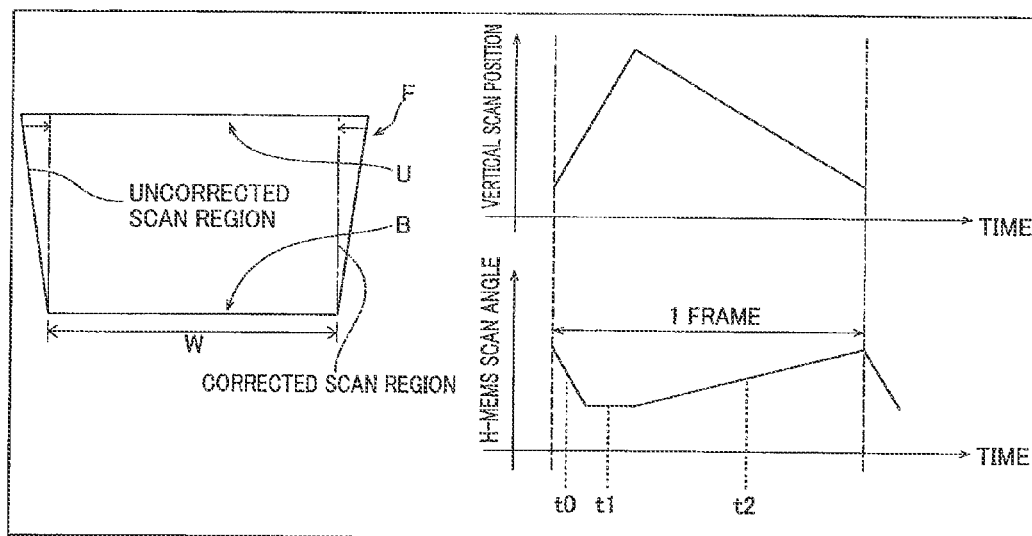
FIG. 7A illustrates correction processing of the projection image according to the embodiment of the present invention and a change of the scan angle in the horizontal direction and the vertical direction in the correction processing.
Figure 7B:
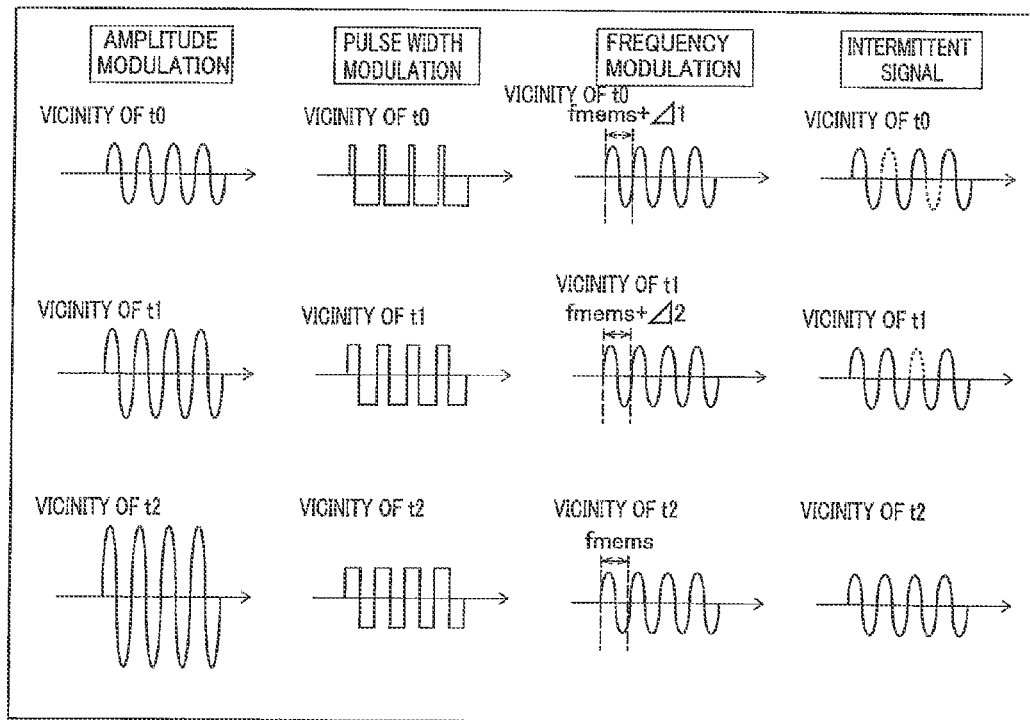
FIG. 7B is a diagram showing examples of drive signals at each point shown in FIG. 7A.

When the projection image F distorted to expand the upper portion as shown in FIG. 7A is corrected, for example, the scan control portion 13 generates a drive signal shown in FIG. 7B at each time (t0, t1, and t2) of scanning shown in FIG. 7A and controls horizontal scanning of the scan mirror 6. In FIG. 7B, examples of an amplitude modulated drive signal, a pulse width modulated drive signal, a frequency modulated drive signal, and an intermittent drive signal are shown as the drive signal. In the amplitude modulation, the signal amplitude of the drive signal is varied with time (t0, t1, and t2). In the pulse width modulation, the duty ratio of the drive signal is varied with time (t0, t1, and t2). In the frequency modulation, the signal cycle of the drive signal is varied with time (t0, t1, and t2). In the intermittent signal, the non-signal period (dotted line portion) of the drive signal is varied with time (t0, t1, and t2).

As described above, with respect to the scan mirror 6, the operation of reducing the horizontal scanning deflection angle has a better response, so that inconveniences may occur when the time for increasing the horizontal scanning deflection angle is too short.

Therefore, the vertical scanning direction is preferably determined so that more time is allocated to a period during which the horizontal scanning amplitude is increasingly changed than to a period during which the horizontal scanning amplitude is decreasingly changed (the period during which the horizontal scanning amplitude is increasingly changed is longer than the period during which the horizontal scanning amplitude is decreasingly changed). Specifically, a change of a target scanning amplitude in one frame period including the blanking period is examined, and the vertical scanning direction is determined so that the scanning amplitude is decreasingly changed when the change is large. Alternatively, the vertical scanning direction may be simply determined so that the scanning amplitude is decreasingly changed during the blanking period according to a scan line width in the case of an uncorrected image.

The vertical scanning direction is determined on the basis of a user's setting operation with the instruction input portion 14, but the laser projector 1 can be so configured that the scan control portion 13 determines the vertical scanning direction without the user's setting operation.

According to this embodiment, the following advantageous effects can be obtained.

According to this embodiment, as hereinabove described, the laser projector 1 is provided with the scan control portion 13 rendering the horizontal scanning amplitude W of the scan mirror 6 on the side having a reduced length relatively large as compared with the horizontal scanning amplitude W of the scan mirror 6 on the side having an increased length with respect to the distortion in which the lengths of the upper side U and the lower side B of the projection image F are different from each other, whereby the distortion of the projection image F can be corrected by a simple method for controlling the horizontal scanning amplitude W of the scan mirror 6. In other words, the distortion of the projection image F can be corrected by a simple method for control of rendering the horizontal scanning amplitude W on the side of the projection image F having the reduced length larger as compared with the horizontal scanning amplitude W on the side of the projection image F having the increased length (see FIGS. 3C and 4C), a simple method for control of rendering the horizontal scanning amplitude W on the side of the projection image F having the increased length smaller as compared with the horizontal scanning amplitude W on the side of the projection image F having the reduced length (see FIGS. 3B and 4B), a combination of these methods (see FIGS. 3A and 4A), or the like.

According to this embodiment, as hereinabove described, the scan control portion 13 is configured to switch between the vertical scanning from the upper side U of the projection image F to the lower side B of the projection image F and the vertical scanning from the lower side B of the projection image F to the upper side U of the projection image F and operate the scan mirror 6. Thus, vertical scanning can be switched to vertical scanning in a proper direction according to the control of the horizontal scanning amplitude W in horizontal scanning.

According to this embodiment, as hereinabove described, the scan control portion 13 is configured to switch the vertical scanning direction to a direction from the side on which the horizontal scanning amplitude W of the scan mirror 6 is relatively reduced to the side on which the horizontal scanning amplitude W of the scan mirror 6 is relatively increased. Thus, the horizontal scanning amplitude W can be increased at the end of vertical scanning, and hence the scan mirror 6 can be driven to reduce the horizontal scanning amplitude W during the blanking period of image frame scanning. Consequently, the horizontal scanning amplitude W of the scan mirror 6 can be controlled with good response during the blanking period.

According to this embodiment, as hereinabove described, the laser projector 1 is provided with the image processing portion 9 changing the order of transfer of the video data of the projection image F according to the vertical scanning direction. Thus, inversion of the projection image F can be easily prevented when the vertical scanning direction is switched.

According to this embodiment, as hereinabove described, the scan control portion 13 is configured to perform at least one of control of increasing the horizontal scanning amplitude W on the side of the projection image F having the reduced length (see FIGS. 3C and 4C) and control of reducing the horizontal scanning amplitude W on the side of the projection image F having the increased length (see FIGS. 3B and 4B). Thus, the horizontal scanning amplitude W of the scan mirror 6 on the side of the projection image F having the reduced length can be easily rendered relatively large as compared with the horizontal scanning amplitude W of the scan mirror 6 on the side of the projection image F having the increased length.

According to this embodiment, as hereinabove described, the scan control portion 13 is configured to generate the drive signal varying with time in one frame and control the horizontal scanning amplitude W of the scan mirror 6 so as to reduce the amount of distortion. Thus, the control of the horizontal scanning amplitude W can be performed with the drive signal varying with time in one frame according to the distorted shape of the projection image F.

According to this embodiment, as hereinabove described, the scan control portion is configured to generate the drive signal varying at least one of the signal amplitude, the duty ratio, the signal cycle, and the non-signal period with time and control the horizontal scanning amplitude W of the scan mirror 6. Thus, by various methods suitable for drive and control of the scan mirror 6, the drive signal varying with time in one frame is generated, and the horizontal scanning amplitude W can be controlled.

According to this embodiment, as hereinabove described, the amplitude modulated drive signal, the pulse width modulated drive signal, the frequency modulated drive signal, or the intermittent drive signal is employed as the drive signal varying with time in one frame. Thus, the drive signal varying at least one of the signal amplitude, the duty ratio, the signal cycle, and the non-signal period with time can be easily generated.

According to this embodiment, as hereinabove described, the scan control portion 13 is configured to perform control of reducing the horizontal scanning amplitude W of the scan mirror 6 during the blanking period between the frames of the projection image F. Thus, the horizontal scanning amplitude W of the scan mirror 6 can be controlled with good response as compared with the case where the horizontal scanning amplitude W of the scan mirror 6 is increased during the blanking period.

According to this embodiment, as hereinabove described, the scan control portion 13 is configured to switch the vertical scanning direction on the basis of the user's setting operation. Thus, the user can determine a proper vertical scanning direction while confirming a display state where the vertical scanning direction is switched, for example.

According to this embodiment, as hereinabove described, the laser projector 1 is provided with the MEMS scan mirror 6. Thus, as compared with other types of scan mirrors, advantageous effects such as downsizing, low power consumption, and speeding up of processing can be obtained.

According to this embodiment, as hereinabove described, the mirror 6b of the scan mirror 6 is configured such that swinging thereof about the outer rotary shaft 6c and swinging thereof about the inner rotary shaft 6e are controlled to be capable of independently controlling vertical scanning and horizontal scanning. Thus, the MEMS scan mirror 6 alone can have two orthogonal axes of motion (vertical scanning and horizontal scanning) without employing another drive mechanism.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the scan control portion is configured to perform control of reducing the horizontal scanning amplitude W of the scan mirror 6 during the blanking period in the aforementioned embodiment, the present invention is not restricted to this. According to the present invention, the horizontal scan angle of the scan mirror 6 may alternatively be increased during the blanking period.

While the scan control portion 13 is configured to switch the vertical scanning direction on the basis of the user's setting operation in the aforementioned embodiment, the present invention is not restricted to this. According to the present invention, the scan control portion may alternatively be configured to switch the vertical scanning direction on the basis of scan information obtained from the scan mirror control portion 8. Specifically, the scan control portion 13 acquires the amount of change of the horizontal scan angle necessary during the blanking period on the basis of the scan information obtained from the scan mirror control portion 8 and inverts the vertical scanning direction on the basis of the amount of change of the horizontal scan angle. According to this, the image processing portion 9 may change the order of transfer of the video data to draw an image from the lower side B to the upper side U. According to this structure, the vertical scanning direction can be switched to a direction of reducing the horizontal scanning amplitude W during the blanking period when the amount of change of the horizontal scanning amplitude W of the scan mirror 6 during the blanking period is large, for example, and hence the scan mirror 6 can be controlled with good response even when the amount of change of the amplitude is large.

In this case, as a threshold of the amount of change of the horizontal scan angle for determining the vertical scanning direction, two individual values (thres1 and thres2) may be set for the vertical scanning direction of correction instructed with the instruction input portion 14, as shown in FIG. 8. In FIG. 8, the correction+side (the upper side of FIG. 8) shows correction of relatively increasing the mirror deflection angle of horizontal scanning on the lower side B of the projection image F (see FIGS. 3A to 3C), and the correction−side (the lower side of FIG. 8) shows correction of relatively reducing the mirror deflection angle of horizontal scanning on the lower side B of the projection image F (see FIGS. 4A to 4C). FIG. 8 shows that the amount of correction is increased as the correction+side and the correction−side are moved to the ends (a correction condition A and a correction condition E) and the amount of correction is zero (no image distortion) at a central correction condition C.

In an example shown in FIG. 8, a first threshold (thres1) is a threshold for vertical scanning from the upper side U of the projection image F to the lower side B of the projection image F, and a second threshold (thres2) is a threshold for vertical scanning from the lower side B of the projection image F to the upper side U of the projection image F. The first threshold is set to be larger than the second threshold. In other words, an instruction is followed up to a relatively large increase (thres1) in the case of the vertical scanning from the upper side U of the projection image F to the lower side B of the projection image F, and the vertical scanning direction is changed at a relatively small reduction (thres2) in the case of the vertical scanning from the lower side B of the projection image F to the upper side U of the projection image F.

Specifically, in the case of the vertical scanning direction from the upper side U to the lower side B, when the user switches the correction condition from the correction+side (A) to the correction−side (E) and the correction condition crosses the first threshold (the correction condition is switched from the correction condition D to the correction condition E), the vertical scanning direction is switched to a direction from the lower side B to the upper side U, and the order of transfer of the video data of the image processing portion 9 is reversed.

In the case of the vertical scanning direction from the lower side B to the upper side U, when the user switches the correction condition from the correction−side (E) to the correction+side (A) and the correction condition crosses the second threshold (the correction condition is switched from the correction condition D to the correction condition C), the vertical scanning direction is switched to a direction from the upper side U to the lower side B, and the order of transfer of the video data of the image processing portion 9 is restored to the original order. Therefore, in the case of the vertical scanning direction from the upper side U to the lower side B, when the correction condition is switched between the correction conditions A to D, the vertical scanning direction is not changed.

According to this structure, employing the general vertical scanning from the upper side U to the lower side B as a basis, the vertical scanning can be switched to the vertical scanning from the lower side B to the upper side U only when it is difficult to employ the vertical scanning from the upper side U to the lower side B. Thus, frequent switching of the vertical scanning direction can be suppressed, and an increase in control load following direction switching can be suppressed.

In the aforementioned embodiment, as described above, the vertical scanning direction is preferably determined so that more time is allocated to the period during which the horizontal scanning deflection angle is increasingly changed than to the period during which the horizontal scanning deflection angle is decreasingly changed (the period during which the horizontal scanning deflection angle is increasingly changed is longer than the period during which the horizontal scanning deflection angle is decreasingly changed) when the vertical scanning direction is switched on the basis of the user's setting operation. Therefore, according to the present invention, the scan control portion may be configured to automatically switch the vertical scanning direction so that the period during which the horizontal scanning amplitude W of the scan mirror 6 is increasingly changed is longer than the period during which the horizontal scanning amplitude W of the scan mirror 6 is decreasingly changed. According to this structure, as the amplitude of the MEMS scan mirror 6 is smaller, the response is generally better, and hence a period of good response can be relatively increased in drive control of the scan mirror 6.

What is claimed is:

1. An image display apparatus comprising:
a light source emitting a laser beam;
a scan mirror projecting an image by a first scanning and a second scanning which scans the laser beam along directions perpendicular to each other, respectively; and
a scan control portion rendering a scanning amplitude of the scan mirror at the second scanning on a side of a projection image having a decreased length relatively large as compared with a scanning amplitude of the scan mirror at the second scanning on a side of the projection image having an increased length;
wherein the scan control portion switches between the first scanning from the upper side of the projection image to the lower side of the projection image and vertical the first scanning from the lower side of the projection image to the upper side of the projection image so that a scanning direction of the first scanning can be switched to a direction from a side on which the scanning amplitude of the scan mirror at the second scanning is relatively decreased to a side on which the scanning amplitude of the scan mirror at the second scanning is relatively increased.

2. The image display apparatus according to claim 1, wherein
the first scanning is a scanning along a longitudinal direction of the image, and
the second scanning is a scanning along a transverse direction of the image.

3. The image display apparatus according to claim 1, further comprising an image processing portion changing order of transfer of video data of the projection image according to the scanning direction of the first scanning.

4. The image display apparatus according to claim 1, wherein
the scan control portion performs at least one of control of increasing the scanning amplitude at the second scanning on the side of the projection image having the decreased length and control of reducing the scanning amplitude at the second scanning on the side of the projection image having the increased length.

5. The image display apparatus according to claim 1, wherein
the scan control portion generates a drive signal varying with time in one frame and control the scanning amplitude of the scan mirror at the second scanning so as to reduce an amount of the distortion.

6. The image display apparatus according to claim 5, wherein
the scan control portion generates the drive signal varying at least one of a signal amplitude, a duty ratio, a signal cycle, and a non-signal period with time and control the scanning amplitude of the scan mirror at the second scanning.

7. The image display apparatus according to claim 6, wherein
the drive signal varying with time in one frame comprises an amplitude modulated drive signal, a pulse width modulated drive signal, a frequency modulated drive signal, and an intermittent drive signal.

8. The image display apparatus according to claim 1, wherein
the scan control portion performs control of reducing the scanning amplitude of the scan mirror at the second scanning during a blanking period between frames of the projection image.

9. The image display apparatus according to claim 1, wherein
the scan control portion switches the scanning direction of the first scanning on the basis of a user's setting operation.

10. The image display apparatus according to claim 1, wherein
the scan control portion switches the scanning direction of the first scanning so that a period during which the scanning amplitude of the scan mirror at the second scanning is increasingly changed is longer than a period during which the scanning amplitude of the scan mirror at the second scanning is decreasingly changed.

11. The image display apparatus according to claim 1, wherein
the scan control portion switches the scanning direction of the first scanning on the basis of an amount of change of the scanning amplitude of the scan mirror at the second scanning during a blanking period between frames of the projection image.

12. The image display apparatus according to claim 11, wherein
the scan control portion switches the scanning direction of the first scanning when the amount of change of the scanning amplitude at the second scanning during the blanking period exceeds a first threshold or a second threshold,
the first threshold comprises a threshold in a case of the first scanning from the upper side of the projection image to the lower side of the projection image,
the second threshold comprises a threshold in a case of the first scanning from the lower side of the projection image to the upper side of the projection image, and
the first threshold is larger than the second threshold.

13. The image display apparatus according to claim 1, wherein
the scan mirror includes a MEMS scan mirror.

14. The image display apparatus according to claim 13, wherein
the MEMS scan mirror has a mirror portion and a first rotary shaft and a second rotary shaft orthogonal to each other in a same plane, and
wherein swinging the mirror portion about the first rotary shaft and swinging the mirror portion about the second rotary shaft are controlled to be capable of independently controlling the first scanning and the second scanning.

15. An image scanning apparatus comprising:
a scanning portion displaying an image by a first scanning and a second scanning which scans a laser beam along directions perpendicular to each other, respectively; and
a scan control portion rendering a width of a scan line of the scanning portion at the second scanning on a side of the image having a decreased length relatively large as compared with a width of a scan line of the scanning portion at the second scanning on a side of the image having an increased length;
wherein the scan control portion switches between the first scanning from the upper side of the image to the lower side of the image and the first scanning from the lower side of the image to the upper side of the image and operate the scanning portion so that a scanning direction of the first scanning can be switched to a direction from a side on which the width of the scan line at the second scanning is relatively decreased to a side on which the width of the scan line at the second scanning is relatively increased.

16. The image scanning apparatus according to claim 15, wherein
   the first scanning is a scanning along a longitudinal direction of the image, and
   the second scanning is a scanning along a transverse direction of the image.

17. The image scanning apparatus according to claim 15, further comprising an image processing portion changing order of transfer of video data of the image according to a scanning direction of the first scanning.

18. The image scanning apparatus according to claim 15, wherein
   the scan control portion performs at least one of control of increasing the width of the scan line at the second scanning on the side of the image having the decreased length and control of reducing the width of the scan line at the second scanning on the side of the image having the increased length.

* * * * *